United States Patent
Chiffert

[15] 3,678,377
[45] July 18, 1972

[54] APPARATUS FOR DETECTING SATURATION PERIODS OF A TRANSFORMER

[72] Inventor: Alain Chiffert, Jouy-en-Josas, France
[73] Assignee: Compagnie Des Compteurs, Paris, France
[22] Filed: Dec. 8, 1970
[21] Appl. No.: 96,182

[30] Foreign Application Priority Data

Dec. 11, 1969 France..................................6942943

[52] U.S. Cl..............................................324/55, 324/51
[51] Int. Cl.......................................................G01r 31/06
[58] Field of Search............................324/51, 55, 52; 317/14

[56] References Cited

UNITED STATES PATENTS 3,474,333  10/1969  Hoel........................................324/52
3,543,092  11/1970  Hoel....................................324/52 X

*Primary Examiner*—Gerard R. Strecker
*Attorney*—Pierce, Scheffler & Parker

[57] ABSTRACT

An apparatus for detecting saturation periods of an electrical transformer in which successive derivative samples of the current flowing in the transformer are compared when the current traverses a zero datum, the signs of the respective derivative samples are also detected, and a logical circuit controlled by the derivative samples as well as their signs functions to produce logic signals of one state or another, i.e., 1 or 0 depending upon whether or not the transformer is saturated.

7 Claims, 4 Drawing Figures

APPARATUS FOR DETECTING SATURATION PERIODS OF A TRANSFORMER

This invention relates to an apparatus for detecting immediately in the current circulating into the secondary winding of a transformer the periods during which said transformer is or not saturated. The apparatus sends a characteristic logical signal corresponding to whether or not the transformer is saturated. It has actually been noticed that it was necessary, particularly with a view of controlling devices detecting line defects, to previously check that the measures made by these detecting devices through said transformers are really made at a moment when the transformers are not saturated.

As it is known, at the moment when a defect is occurring on a line, it occurs a component of aperiodic current which is superposed to the line current and is consequently applied to the primary windings of the transformers which then can reach the saturation point, especially when a defect occurs on an already loaded line. It is obvious that when measures are made to detect the line defect, these measures are entirely wrong if they are made when a transformer is saturated.

The invention copes with this difficulty and enables that the measures be always made when the transformers are not saturated.

According to the invention, the apparatus includes a detector of the current circulating into the transformer secondary winding, an amplifier sending out square pulses indicating the moments when said current becomes null, a first differentiating circuit connected to said amplifier, a second differentiating circuit connected, on one hand, to the secondary winding of said transformer and, on the other hand, to a sampling circuit controlled by said first differentiating circuit, whereby obtaining samples of the derivative of said current at each moment when it becomes null in said transformer secondary winding, two comparator circuits placed top to bottom and connected to said sampling circuit, said comparator circuits comparing the derivative samples at two successive moments when the secondary winding current is null, whereby not sending out output signal when said samples are of same magnitude, but one or the other sending out a signal when said successive samples are different, in order to determine the positive or negative way of the possible transformer saturation, a logical unit connected to the output of said comparator circuits and receiving said signals from these circuits, and an amplifier for detecting the sign of the current derivative connected to said second differentiating) circuit and to said logical unit, whereby said logical unit is at a first logical state when there is concordance between the sign of the derivative and one of the signals sent out by said comparator circuits and at a second logical state when there is no concordance said logical states determining whether the transformer is saturated.

Other characteristics of the invention are shown by the following detailed description.

Embodiment of the invention is shown by way of none restrictive example in the accompanying drawing.

Figure 1:
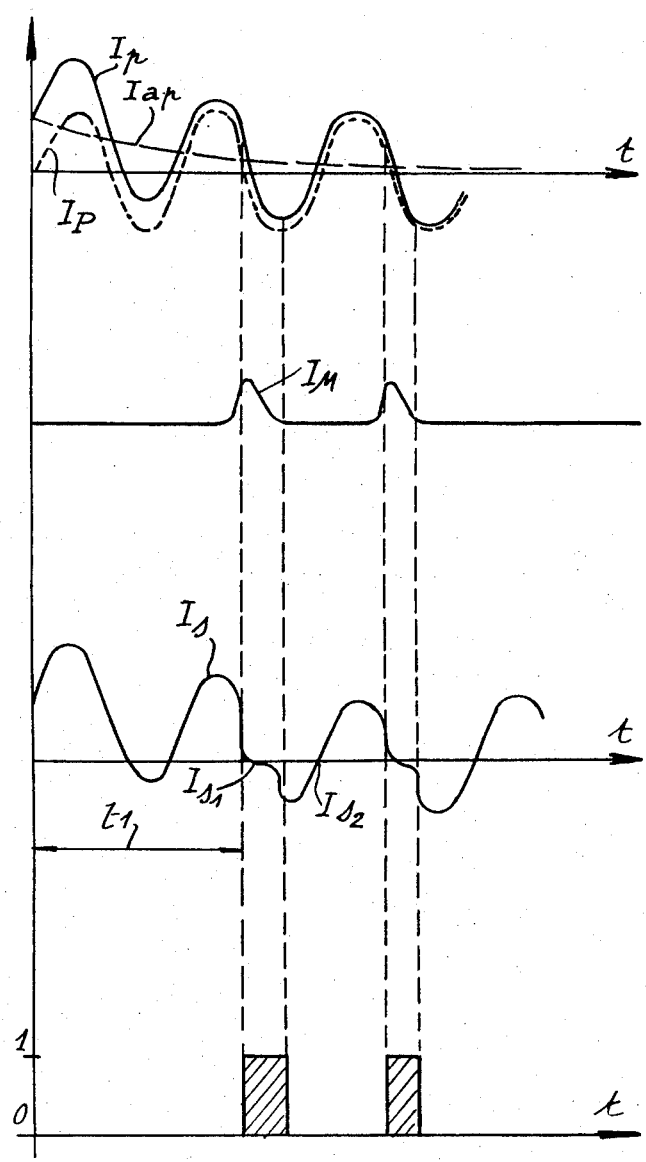
FIG. 1 is a set of curves illustrating the occurence of an aperiodic current in a transformer.

In FIG. 1 has been represented in $I_p$ the sinusoid representing the current in the primary winding of a transformer upon a normal operation; in $I_{ap}$ a positive, continuous, aperiodic component which appears when a defect occurs on the line where is connected the primary winding of the transformer. Of course, the aperiodic component could be negative instead of being positive but to simplify the understanding of the invention in the following disclosure, said component is considered as being positive. The appearance of the aperiodic component $I_{ap}$ of course modifies the wave form of the primary current and this is represented in $I_{p'}$.

A transformer being an apparatus in which occurs hysteresis phenomena, the current in the secondary winding is not instantaneously influenced by the aperiodic component, but only when appears a current called magnetizing current which is represented in FIG. 1 as $I \mu$. This magnetizing current appears at the end of a variable time, for example the time $t_1$ and then the current in the transformer secondary winding, which is designated by $I_s$, is modified in the form thereof, that is, it does not reproduce the current $I_p$ in the primary winding $a$. Especially the times, when the current is null in the secondary winding, are different from the moments when the current in the primary winding is null, the current $I_s$ being then null for times that can be rather long.

The saturation of the current transformer, of course, depends on the load thereof and according to the sign of the aperiodic component, this saturation can occur in the direction +B max. or −B max.

In the case of a positive aperiodic component, for which the saturation occurs in the direction +B max., it is noticed that at time $t_1$ where appears the first component of magnetizing current $I \mu$ the current at the secondary winding abruptly drops to zero, the slope of the wave form then becoming very low since the transformer has become saturated. It has now been noticed that at points $I_{s1}$ and $I_{s2}$ where the current $I_s$ passes through zero and for which are respectively obtained the negative derivatives $di/dt$ and positive derivatives $di/dt$, the modulus of the negative derivative was smaller than the modulus of the positive derivative. In other words it can be written:

$$\left|\frac{di}{dt}\right|_{I_{s1}} < \left|\frac{di}{dt}\right|_{I_{s2}} \quad (1)$$

It has also been noticed that for a positive aperiodic component, then the transformers are not saturated if the derivative is positive, for example, in $I_{s2}$ the current in the secondary winding follows the current in the primary winding. This is not the case in $I_{s1}$.

For a negative aperiodic component and in the same conditions, that is when the current $I_s$ passes through zero at points $I_{s1}$ and $I_{s2}$, the modulus of the positive derivative is then larger than the modulus of the negative derivative, $$\left|\frac{di}{dt}\right|_{I_{s1}} > \left|\frac{di}{dt}\right|_{I_{s2}} \quad (2)$$

and, in the latter case, if the derivative $di/dt$ is negative, then the transformer is not saturated.

On the contrary, when the derivative modululi at points $I_{s1}$ and $I_{s2}$ are equal, the transformer is not saturated even if an aperiodic, positive or negative component is present. This is the case within the time $t_1$.

The method of the invention comprises the steps of determining both the moment when the transformer becomes saturated, that is the time $t_1$, and, on the other hand, the direction of the saturation, that is the positive or negative direction of the aperiodic component of the secondary current. When knowing the direction of the saturation, it is then possible to deduce, through the sign of the derivative of the secondary current, the moments when the transformer is not saturated during the existence of the aperiodic component.

In other words, it is checked whether the relations 1 or 2 exist. It is then checked the sign of the derivative. If it is the relation 1 which occurs, the transformer is not saturated during all the time when this derivative is positive. If the relation 2 occurs, the transformer is not saturated during the time when this derivative is negative.

The derivative sign and also the determination of the moments when the current becomes null at the secondary winding are used to control a relay, for example by means of a logical unit which shows a state 0 when the transformer is not saturated and a state 1 during the times when the transformer is saturated; this is shown on the last curve of FIG. 1.

Figure 2:
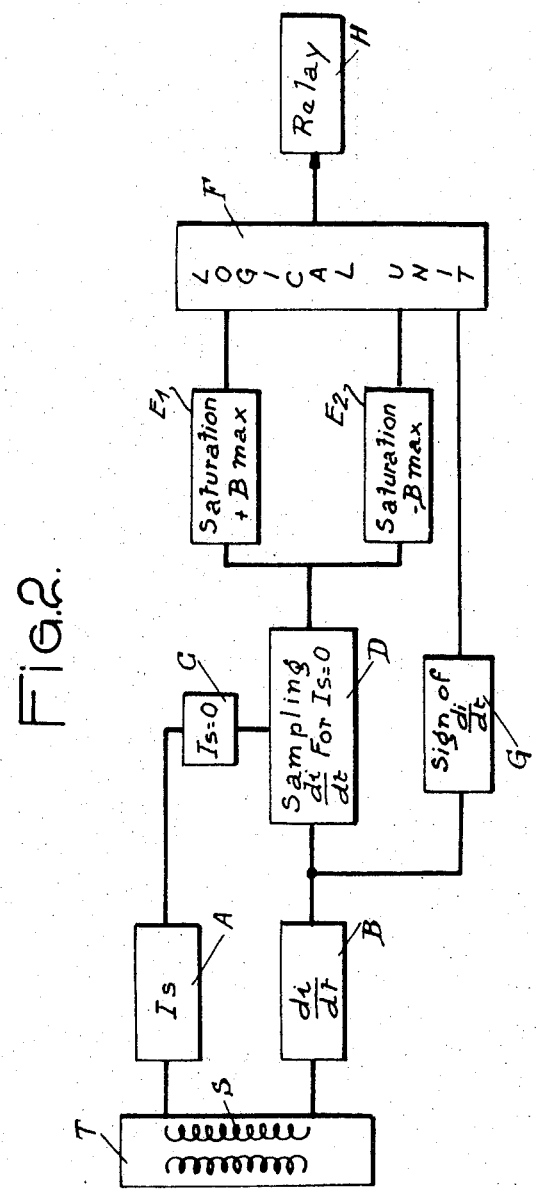
FIG. 2 is a block diagram illustrating the embodiment of the invention.

The method of the invention is embodied in FIG. 2. The secondary current $I_S$ is detected in A at the output of the secondary windings of transformer T. The derivative $di/dt$ is detected in B at the output of said secondary winding. The moments where the current $I_s$ is null are detected in C.

At output of a sampling device D operated by device C, are obtained, for example in the form of voltage pulses, samples from the derivative $di/dt$ when current $I_s$ is null. The samples are in turn positive and negative, and the moduli thereof are then respectively compared in comparator devices $E_1$ and $E_2$ which are respectively sensitive to the direction of the aperiodic component. These comparator devices are providing a logical unit F with informations showing if there is an aperiodic component and the direction in which the transformer can get saturated or is already saturated, that is the direction +B max. or −B max. In addition, a device G is provided, at the output of device B establishing the derivative of current $I_s$, to estimate the sign of this derivative. The informations from the device B as to the sign of the derivative is also sent to the logical unit F. The logical unit F, in turn, sends out to a relay H, an information which is for example O if the device $E_1$ sends out an information showing the presence of an aperiodic component, the sign of the derivative $di/dt$ being then positive, and the logical unit F gives an information of state 1 when said derivative is negative. On the contrary, when an information is sent out from comparator device $E_2$ and shows thus the presence of an aperiodic component tending to saturate the transformer in the direction −B max., the logical unit F sends out a signal of state 0 when the derivative sign is negative and state 1 when this sign is positive. If no information comes out from comparator devices $E_1$ and $E_2$, then the logical unit sends out a signal of state O, whatever the sign of the derivative may be, since the moduli of the respective derivative at points $I_{s1}$ and $I_{s2}$ are then equal and the transformer is not saturated.

Figure 3:
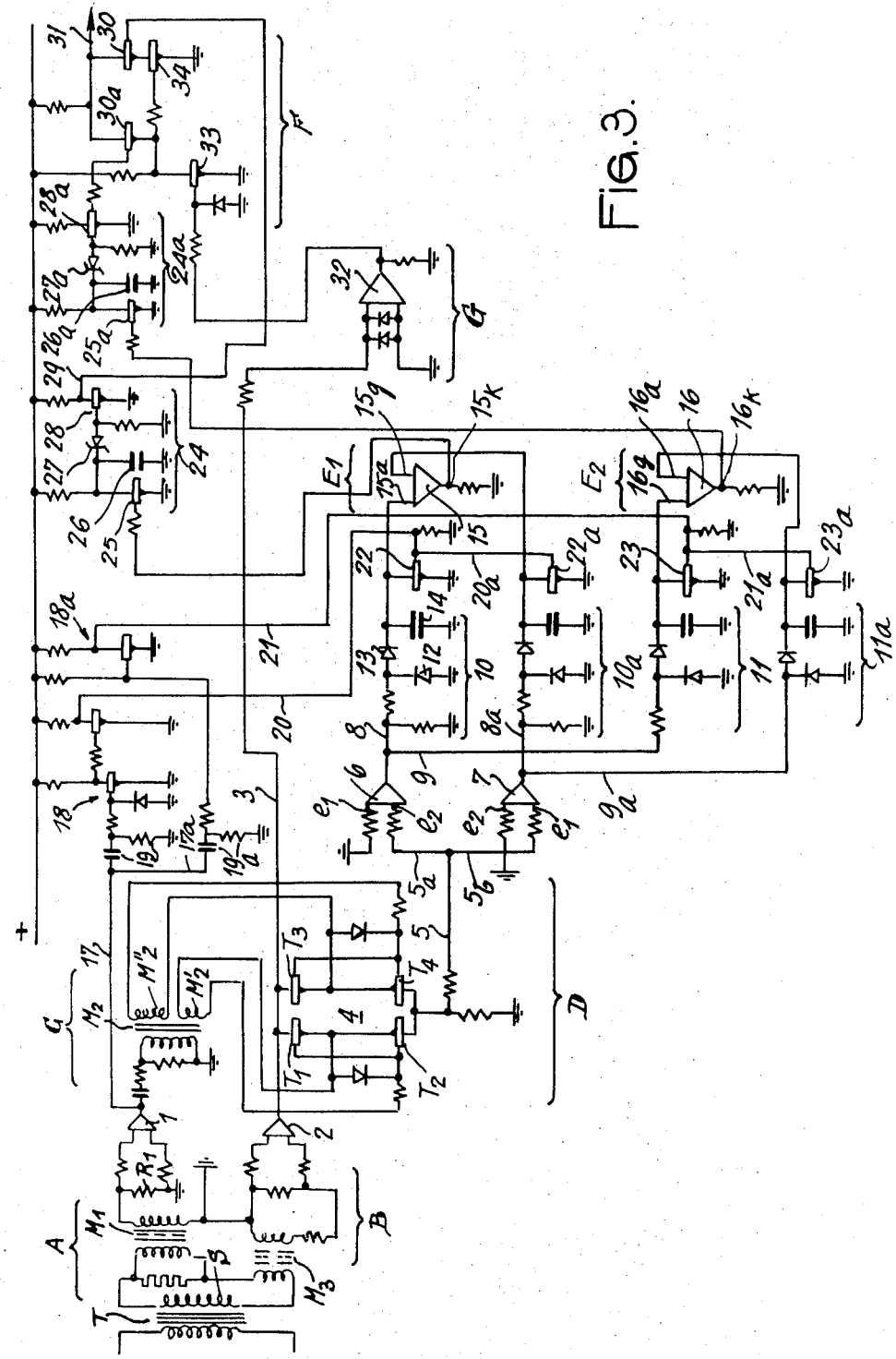
FIG. 3 is a circuit diagram of the apparatus of the invention.
Figure 4:
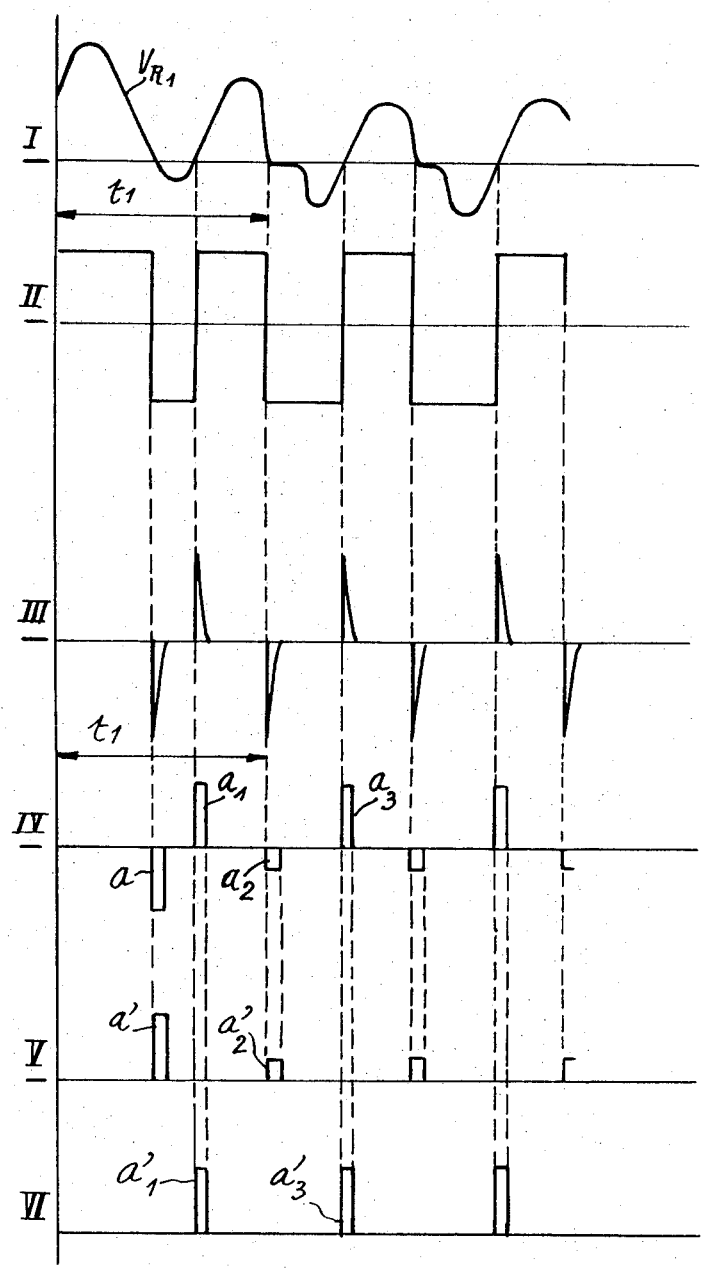
FIG. 4 is an illustrative set of curves.

FIG. 3 illustrates an embodiment of the invention. The circuit of secondary S of transformer T is provided in derivation with a mutual inductance $M_1$ conducting current to a resistance $R_1$ at which terminals thereof exists a voltage $V_{R1}$ which is an image of current $I_s$ passing through the secondary winding S of transformer T. The curve I of FIG. 4 shows said voltage $V_{R1}$. The voltage $V_{R1}$ is used to feed a high gain amplifier 1 providing a constant voltage magnitude as long as $V_{R1}$ is not null, whereby is obtained, as shown on curve II of FIG. 4, a voltage in rectangular square pulses. The output of amplifier 1 is connected, through connecting elements, to a mutual inductance $M_2$ with two secondary windings $M'_2$, $M''_2$ respectively utilized to supply a set of transistors $T_1$, $T_2$ and $T_3$, $T_4$ respectively connected in opposition and constituting what is called in the art a chopper 4. The chopper 4 provides a voltage sampling when the active components thereof, namely the above transistors $T_1$ to $T_4$ are made conductive by pulses sent out by secondary windings $M'_2$ and $M''_2$. In fact, the mutual inductance $M_2$ constitutes a differentiating circuit of the square pulses output voltage from the amplifier 1 and consequently, said secondary windings $M'_2$ and $M''_2$ send out sharp pulses as shown on curve III of FIG. 2. The straight front of said pulses corresponds to moments when the square pulse voltage of curve II passes through zero, that is at the moment when the current $I_s$ in the secondary windings becomes null.

The circuit of secondary winding S of transformer T is also connected in series with the primary winding of a mutual inductance $M_3$. So is obtained, at the secondary winding of this mutual inductance, a voltage which is the image of the derivative $di/dt$ of current $I_s$. The secondary winding of the mutual inductance $M_3$ is connected to a low gain amplifier 2 which is itself connected through a conductor 3 to the collector of the transistors $T_1$ and $T_3$ of the above described chopper 4.

The voltage corresponding to the derivative of current $I_s$ is thus applied to the inputs of the chopper which is besides made conductive by the derivative pulses of the square pulse voltage corresponding to current $I_s$. Consequently when the current $I_s$ is null at the secondary winding S of transformer T, said chopper sends out on the output conductor 5 thereof, signals as represented on curve IV of FIG. 4, these signals being samples of the derivative $di/dt$ of current $I_s$ at the moments when said current $I_s$ is itself null.

When referring to curve IV and also at curve I of FIG. 4, it is to be noticed that during the time interval $t_1$ which precedes the appearance of magnetizing current $I\mu$ described with reference to FIG. 1, and while the transformer is not yet saturated because of the hysteresis thereof, then are obtained derivative samples such as $a$, $a_1$ alternately positive and negative, and having the same amplitude. On the contrary upon the appearance of the first magnetizing overcurrent $I\mu$ are obtained derivative samples $a_2$, $a_3$ alternately positive and negative as previously, but with a different amplitude. In the considered case of the positive magnetizing aperiodic component, the derivative samples with positive sign have the greater amplitude.

The derivative samples of curve IV are applied to the inputs of two amplifiers 6 and 7 placed in opposition to each other. This is shown in FIG. 3 wherein a conductor $5a$ is connected to the input $e_2$ of amplifier 6, input $e_1$ thereof being grounded whilst a conductor $5bis$ connected to input $e_1$ of amplifier 7, the input $e_2$ thereof being grounded; said conductors $5a$ and $5b$ are moreover connected to each other and to conductor 5, at output of the chopper 4.

The positive samples $a$, $a_2$, etc., of curve IV are thus amplified by amplifier 6 to send out samples $a'$, $a'_2$, etc., as shown on curve V. In a similar way, the negative samples $a_1$, $a_3$, etc., of curve IV are amplified by amplifier 7, the output thereof sending out samples with modified signs, that is positive $a'_1$, $a'_3$, etc. The output of amplifier 6 is connected through conductors 8 and 9 respectively to two temporary memories 10 and 11, each of them including, besides connecting resistances, a diode 12 for eliminating the negative component, a no-return diode 13 and a memory condenser 14. In a similar way, the output of amplifier 7 is connected through conductors $8a$, $9a$ respectively to two temporary memories $10a$, $11a$ respectively. From above it has been noticed that a positive sample, such as sample $a'$ of curve V is set into memory in both temporary memories 10 and 11 and that a sample previously negative, such as $a'_1$, but made positive by amplifier 7, is simultaneously set into memory in temporary memories $10a$ and $11a$.

The memories 10 and $10a$ are respectively connected to anode $15a$ and to the grid $15g$ of a first controlled transistor 15, and the memories 11 and $11a$ are respectively connected to grid $16g$ and to anode $16a$ of a second controlled transistor 16. From above it is noticed that anode $15a$ of controlled transistor 15 is successively controlled by the memorized samples $a'$, $a'_2$, etc. of curve V on FIG. 4, while anode $16a$ of controlled transistor 16 is successively controlled by the memorized samples $a'_1$, $a'_3$, etc. of curve VI on FIG. 4. In a similar way, the memorized samples in the temporary memory $10a$ are successively applied to the grid $15g$ of controlled transistor 15, and the memorized samples in the temporary memory 11 are applied to grid $16g$ of controlled transistor 16. Thus, and with reference to curve IV of FIG. 4 corresponding to the illustrated case of a positive aperiodic component, at the moment $t_1$ the sample $a_2$ is amplified by amplifier 6 and set into memory in the form $a'_2$ in the memory 10 as well as in memory 11.

When the current passes again through zero in the secondary winding S of transformer T, the chopper 4 extracts the sample $a_3$ from the derivative sent out by the mutual inductance $M_3$, and said sample is amplified and the sign thereof changed by reversed amplifier 7, then set into memory in the form $a'_3$ in memories $10a$ and $11a$.

Since the sample $a'_2$ is of an amplitude higher than sample $a'_3$ and since it is sample $a'_2$ which is applied to anode $15a$ of controlled transistor 15, said sample makes conductive the transistor which, thus, sends out a pulse on cathode $15k$ thereof. On the contrary, concerning the controlled transistor 16, the anode $16a$ thereof receiving a pulse of lower amplitude than the one applied to the grid, this transistor is not made conductive and no pulse is sent out from cathode $16k$ thereof.

The output of high gain amplifier 1 is further connected through a conductor 17 and a shunt $17a$ from said conductor to two return-to-zero circuits 18 and $18a$ respectively. These return-to-zero circuits include circuits 19, 19a having a very low time constant, said time constant being actually lower than the time when chopper 4 is made conductive by the derivative pulses of curve III on FIG. 4. The return-to-zero circuit 18 is connected through conductors 20, 20a to temporary memories 10 and 10a and the return-to-zero circuit 18a is connected through conductors 21, 21a to temporary memories 11 and 11a. The above return-to-zero circuits are designed to make conductive the transistors 22–22a regarding the circuit 18, and transistors 23–23a regarding the circuit 18a; when made conductive these transistors provide the discharge of condensers such as 14 constituting the temporary memories.

In the embodiment shown in FIG. 3, the return-to-zero circuit 18 makes conductive the transistors 22 and 22a, for instance upon receiving a negative pulse from high gain amplifier 1 and this occurs, during the very short period of time as mentioned above. Thus, considering for instance as previously that the sample $a'$ has to be set into memory, it is noticed that this occurs the memories 10 and 10a are previously cancelled due to the fact that transistors 22, 22a, are made conductive by the short pulse sent out by amplifier 1 and limited by the time constant 19. In the same way, before storing into memories 10a and 11a the sample $a'_3$, content of said memories 10a, 11a are cancelled since transistors 23, 23a are made conductive by the return-to-zero circuit 18a rendered active by the following pulse sent out by the high gain amplifier 1 and limited in time by the time constant 19a.

This method is, of course, operated, in the same way, for the following pulses, having, at each time, only to compare the two derivative samples which are memorized and applied through the four memories to the two controlled transistors 15 and 16 respectively, and in the same way as described above. Informations coming from the cathode 15k means that the above relation (1) is being checked. On the contrary, if informations were sent out by cathode 16k, it is then the relation (2) which would be checked.

It is known that the controlled transistors operate as analogic amplifiers and when they are made conductive they send out pulses.

FIG. 3 shows that the controlled transistor 15 is connected to a first threshold circuit 24 operating as a temporary memory and that controlled transistor 16 is connected to a second threshold circuit 24a. Circuit 24 is provided with a transistor 25 placed in parallel with a capacitor 26 in the feeding circuit of a Zener diode 27 provided to polarize an output transistor 28 the collector thereof being connected through a conductor 29 to a transistor 30. The circuit 24a comprises the same parts with an index a, and the collector of transistor 28a is connected to the base of a transistor 30a, being a part, as transistor 30, of the logical unit F.

In the said example, the pulses are sent out by controlled transistor 15 and, consequently, they make conductive the transistor 25 at intervals of time so close that capacitor 26 cannot be charged to a voltage corresponding to the passage threshold of the Zener diode 28. Consequently transistor 28 is blocked and transistor 30 is made conductive.

The circuit 24a does not receive pulses from controlled transistor 16 and, consequently capacitor 26a is charged, the Zener diode 27a is conductive, consequently the transistor 28 is also conductive and transistor 30a is blocked.

In logical unit F, it is not enough that the transistor 30 be conductive for providing the output 31 with the signal of state 1 indicating that the transformer T is saturated at +B max. In fact, as explained at the beginning of the present disclosure, it is also necessary to check the sign of the derivative of current $I_s$. To do so, the low gain amplifier 2 delivering a voltage corresponding to the derivative of current $I_s$ is connected, through conductor 3 leading to chopper 4, to an amplifier 32. Said amplifier 32 is of the analogue-to-logical type and at the output thereof, sends out positive or negative rectangular signals corresponding to the signs of the derivative applied to the input thereof.

Assuming that the amplifier 32 sends out a positive signal, it then indicates that the derivative is positive and consequently in that case it makes conductive a transistor 33, the collector thereof being connected to the base of a transistor 34 series mounted with transistor 30. Since transistor 33 is made conductive, then transistor 34 is blocked and consequently a state 1 appears on collector of transistor 30, and therefore on output 31 controlling the release of relay H of FIG. 2. On the contrary, if the derivative sign is negative, transistor 33 is blocked and consequently the transistor 34 is made conductive.

Because transistor 30 has been made conductive, as described above, by the pulses sent out by controlled transistor 15, the current passing through said transistor 30 is grounded through transistor 34. Therefore output 31 is at a state 0. This corresponds to the presence of an aperiodic component on the primary winding of transformer 1 but of an intensity not sufficient to saturate said transformer, which can occur especially if said secondary winding is just a little loaded.

It is to be noticed that the state 1, which indicates a transformer saturation, is kept only for the time when exist pulses sent out by controlled transistor 15, because as soon as these pulses stop the circuit 24 becomes conductive and transistor 30 is no longer conductive.

In case the pulses would be sent out by controlled transistor 16, that is if the aperiodic component would tend to saturate the transformer in the direction —B max., transistor 28a of threshold circuit 24a would not be conductive and transistor 30a would be conductive to tend to establish a state 1 on output 31. A state 1 could nevertheless be established on output 31 only in case the transistor 33 would not be conductive, that is for a positive sign of the derivative.

The relay H, controlled in function of the two states that can have the logical unit F, can be utilized in different applications and especially to prevent measures for determining a line defect during the time transformer T is saturated. Actually measures taken during the saturation period would give wrong results.

The invention is not restricted to the embodiment shown and described in detail for various modifications thereof can moreover be applied to it without departing the scope of the invention as defined in the appended claims.

I claim:

1. In an apparatus for detecting periods of saturation of an electrical transformer including primary and secondary windings, the combination comprising:

a detector connected to said secondary winding for detecting the current flowing therein;

an amplifier connected to the output of said detector and which produces a series of spaced square wave pulses determinative respectively of the moments when said current becomes null;

a first differentiating circuit having its input connected to the output of said amplifier for differentiating said square wave pulses;

a sampling circuit connected to the output of said first differentiating circuit;

a second differentiating circuit having its input connected to said secondary winding and its output connected to and controlling the operation of said sampling circuit to obtain samples of the derivative of said current flowing in said secondary circuit at each moment when it becomes null, a pair of magnitude comparator circuits connected in opposition to each other and which are respectively connected to the output from said sampling circuit, said comparator circuits serving to compare magnitudes of the samples of the derivatives of said current at two successive moments for which the current in said secondary winding is null, neither of said comparators producing an output signal when said compared samples have the same magnitude and one of said comparators producing an output signal when said samples are of different magnitudes whereby the direction either positive or negative of the saturation of the transformer is determined, a logical circuit connected to the outputs of said comparator circuits to receive the signals therefrom, and means connected to the output of said second differentiating circuit for producing different signals corresponding respectively to the sign of the current derivative and which signals are connected to and control the operation of said logical circuit such as to establish at its output a signal corresponding to a first logical state when concordance exists between the sign of the derivative and the comparator output signal, and a signal corresponding to a second logical state when no concordance exists thereby determining the moment at which said transformer is saturated.

2. Apparatus as defined in claim 1 for detecting periods of saturation of an electrical transformer wherein said sampling circuit comprises two sets of transistors respectively connected in opposition, one transistor in each set being connected to said second differentiating circuit and each of the two transistor sets being connected to two secondary windings of a mutual inductance constituting said first differentiating circuit, whereby the alternately positive and negative derivatives formed from said first differentiating circuit, when the current flow in the transformer secondary winding traverses a zero datum, make alternately conductive said two transistor sets to produce at a common output thereof derivative samples having a duration corresponding to the derivatives of said first differentiating circuit, the amplitude and sign of said derivative corresponding to the current derivative produced by said second differentiating circuit.

3. Apparatus as defined in claim 1 for detecting periods of saturation of an electrical transformer wherein said second differentiating circuit comprises a mutual inductance coupled to the transformer secondary circuit and which is connected to a low gain amplifier, whereby the derivative of the current flowing in said transformer secondary winding and created in said mutual inductance is accurately reproduced.

4. Apparatus as defined in claim 1 for detecting periods of saturation of an electrical transformer wherein each said magnitude comparator circuit comprises an amplifier having respective inputs reversed and which are connected to the output of said sampling circuit, there being two memory circuits connected to the output of each said amplifier, one of the two memory circuits assigned to each said amplifier being connected to a controlled transistor, whereby the derivative samples produced by said sampling circuit are first changed into signals of the same sign by said amplifiers, and then two successive stored signals in said memory circuits are each time compared by said controlled transistors, whereby only one of said controlled transistors produces an output signal when the two signals it receives make it active, said activated controlled transistor thus defining the positive or negative direction for which said transformer tends to become saturated and defining consequently the presence of a positive or negative aperiodic component which is superposed to the current flowing in the primary winding of said transformer.

5. Apparatus as defined in claim 4 for detecting periods of saturation of an electrical transformer and which further comprises two return-to-zero circuits connected to the output of said amplifier which amplifies the output of said detector determining the moments when the current flow in said secondary winding becomes null, said two return-to-zero circuits being respectively sensitive to positive pulses and to negative pulses and being each respectively connected to one of the two memory circuits of the magnitude comparator circuits, both of said return-to-zero circuits having a time constant substantially shorter than the duration of the derivative sample produced by said sampling circuit, whereby the content of said memory circuits are cancelled at the beginning of each comparison cycle and during times much shorter than the time during which the derivative samples to be compared are sent out.

6. Apparatus as defined in claim 4 for detecting periods of saturation of an electrical transformer wherein said logical circuit comprises two gate circuits and two threshold circuits each provided with a Zener diode and a capacitor, said Zener diode being connected to and controlling a first transistor whose conductive or non-conductive state pre-establishes one of the logical states of said logical circuit to outline said logical state, a second transistor being connected to said capacitor for controlling the charge thereof and being connected to one of the two magnitude comparator circuits at output from corresponding controlled transistors, whereby pulses coming from one of said controlled transistors prevent charging of said capacitor thus causing blocking of the second transistor of said threshold circuit and making conductive one of the two gate circuits of said logical circuit.

7. Apparatus as defined in claim 6 for detecting periods of saturation of an electrical transformer wherein said means for producing different signals corresponding respectively to the sign of the current derivative comprises an analog amplifier connected to the output of said second differentiating circuit for forming signal pulses having a sign corresponding to the sign of the current derivative formed by said second differentiating circuit, the output from said analog amplifier being connected to one of the two gate circuits of the logical circuit to put the same to one of two possible logical states in function of the outline of logical state made by one of the two gate circuits which are controlled by the threshold circuits.

* * * * *